United States Patent [19]

Everts

[11] Patent Number: 5,109,607

[45] Date of Patent: May 5, 1992

[54] AUTOMATIC LINE TRIMMER HEAD

[75] Inventor: Robert G. Everts, Chandler, Ariz.

[73] Assignee: Inertia Dynamics Corporation, Chandler, Ariz.

[21] Appl. No.: 597,818

[22] Filed: Oct. 12, 1990

[51] Int. Cl.⁵ .............................................. B26B 7/00
[52] U.S. Cl. ...................................... 30/276; 30/347; 56/12.7
[58] Field of Search ............. 30/276, 285, 347, 272.1, 30/296.1; 56/12.7

[56] References Cited

U.S. PATENT DOCUMENTS

| | | | |
|---|---|---|---|
| 4,097,991 | 7/1978 | Proulx | 30/276 |
| 4,104,796 | 8/1978 | Sheldon | 30/276 |
| 4,131,997 | 1/1979 | Utter | 30/276 |
| 4,136,446 | 1/1979 | Tripp | 30/276 |
| 4,145,809 | 3/1979 | Proulx | 30/276 |
| 4,151,646 | 5/1979 | Lane | 30/276 |
| 4,161,820 | 7/1979 | Moore | 30/276 |
| 4,167,812 | 9/1979 | Moore | 30/276 |
| 4,168,572 | 9/1979 | Ewing | 30/276 |
| 4,185,381 | 1/1980 | Palmieri et al. | 30/347 |
| 4,194,287 | 3/1980 | Palmieri et al. | 30/276 |
| 4,195,408 | 4/1980 | Palmieri et al. | 30/276 |
| 4,203,212 | 5/1980 | Proulx | 30/276 |
| 4,236,311 | 12/1980 | Mitchell | 56/12.7 |
| 4,242,797 | 1/1981 | Palmieri et al. | 30/276 |
| 4,259,782 | 4/1981 | Proulx | 30/276 |
| 4,274,201 | 6/1981 | Oberg et al. | 30/276 |
| 4,285,127 | 8/1981 | Zerrer et al. | 30/276 |
| 4,366,621 | 1/1983 | Mitchell | 30/276 |
| 4,369,577 | 1/1983 | Gise et al. | 30/276 |
| 4,419,822 | 12/1983 | Harris | 30/276 |
| 4,426,780 | 1/1984 | Foster | 30/276 |
| 4,458,419 | 7/1984 | Proulx | 30/276 |
| 4,476,632 | 10/1984 | Proulx | 30/276 |
| 4,524,515 | 6/1985 | Oberg | 30/276 |
| 4,566,189 | 1/1986 | Muto | 30/276 |
| 4,607,431 | 8/1986 | Gay | 30/276 |
| 4,633,588 | 1/1987 | Pittinger, Jr. | 30/347 |
| 4,651,421 | 3/1987 | Zerrer | 30/347 |
| 4,660,286 | 4/1987 | Engelbrecht et al. | 30/276 |
| 4,667,410 | 5/1987 | Weid et al. | 30/347 |
| 4,738,085 | 4/1988 | Nishio et al. | 56/12.7 |
| 4,790,071 | 12/1988 | Helmig et al. | 30/276 |
| 4,817,288 | 4/1989 | Hirose et al. | 30/276 |
| 4,823,465 | 4/1989 | Collins | 30/276 |
| 4,835,867 | 6/1989 | Collins et al. | 30/276 |
| 4,882,843 | 11/1989 | Baba | 30/276 |
| 4,897,923 | 2/1990 | Collins | 30/276 |
| 4,926,557 | 5/1990 | Haupt | 30/276 |
| 4,942,664 | 7/1990 | Zatulovsky | 30/276 |
| 5,020,223 | 6/1991 | Desent et al. | 30/276 |

OTHER PUBLICATIONS

Booklet entitled "Outdoor Power Equipment" Buyers Guide—dated Dec. 1989—p. 29.

Primary Examiner—Frank T. Yost
Assistant Examiner—Hwei-Siu Payer
Attorney, Agent, or Firm—Brooks & Kushman

[57] ABSTRACT

A line trimmer head 10 for a vegetation cutter having an automatic line feed mechanism which replenishes the line 19 as a result of changes in centrifugal force. The line trimmer head 10 comprises a reel housing 14 which rotates with a shaft 12. A spool 18 containing a supply of line 19 is located within the housing 14. An indexer cam 16 is journaled on the shaft 12 and is axially and rotatably shiftable with respect to the shaft 12. The indexer cam 16 is periodically axially shifted and rotated by a reduction in the centrifugal force applied by the line 19 to the spool 18. A spring 20 is provided to bias the indexer cam 16 axially relative to the housing 14 away from an interlocked posiiton. In the interlocked position, the indexer cam 16 and housing 14 are interlocked together so that the spool 18, indexer cam 16, housing 14 and shaft 12 rotate together. The indexer cam 16 is shifted axially to cause the indexer cam 16 to be disengaged from the housing 14 allowing the spool 18 and indexer cam 16 to rotate relative to the housing 14. As the spool rotates a predetermined incremental amount relative to the housing, an increment of line 19 is fed from the spool 18. Centrifugal force applied by the line 19 may be reduced by either a reduction in the length of the line 19 or by a reduction in the speed of rotation of the shaft 12.

12 Claims, 2 Drawing Sheets

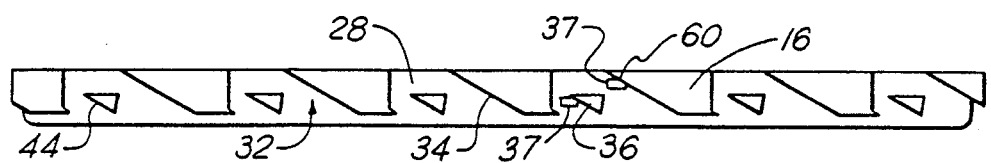
FIG. 4
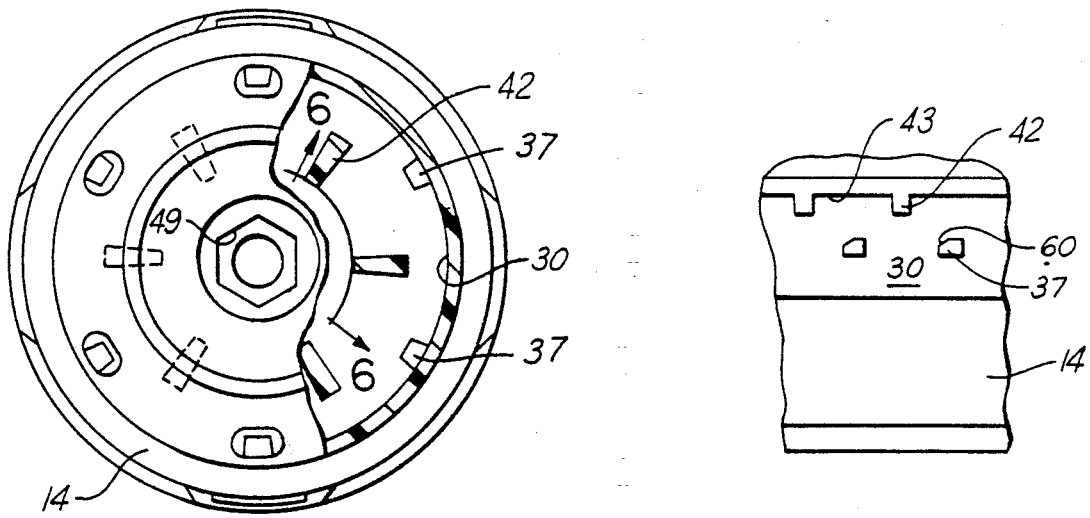
FIG. 5
FIG. 6

AUTOMATIC LINE TRIMMER HEAD

TECHNICAL FIELD

The present invention relates to line trimmers for motor driven vegetation cutters. More particularly, the invention relates to a head for a line trimmer which includes automatic line feed.

BACKGROUND ART

Line trimmers are used to cut vegetation such as grass or weeds. Trimming with a line trimmer offers advantages in that the line can cut vegetation against walls or around stones without damage. However, the line normally is abraded when vegetation is cut or when other objects are contacted. The line may also break off close to the housing if the trimmer abruptly contacts the ground or another object. When the line breaks off, it is necessary to feed a new increment of line from the spool, and out of the housing.

Various automatic feed mechanisms have been contrived that have achieved the objective of providing an automatic feed mechanism. However, several problems are inherent in many of the designs. One problem is controlling the length of line allowed to feed from the spool. Another problem is providing an automatic line feed which is easy to use.

A line feed mechanism must be durable. Automatic line feed mechanisms must be capable of enduring wear and tear of high speed operation, as well as impacts with objects. For this reason, line trimmer heads having automatic feed mechanisms requiring close calibration or relying upon small spring elements and multiple piece linkages present problems.

Another aspect of automatic feed line trimmer heads is that they should be easy to manufacture. Line trimmer heads which require intricate assembly or calibration complicate the manufacturing process.

The line feed mechanism must be well suited to provide limited line advance when the line is abraded and becomes worn. It is also desirable to replenish the line immediately upon breakage of the line.

The most common type of automatic line feed advance is commonly referred to as "bump feed" wherein the head of the line cutter is bumped against the ground to cause the spool to feed out a length of line. Examples of bump feed devices include U.S. Pat. No. 4,185,381 to Palmieri, et al.; U.S. Pat. No. 4,274,201 to Oberg, et al.; and U.S. Pat. No. 4,882,843 to Baba. Bump feed line advance mechanisms have tended to be difficult to control. Constantly bumping the head of the unit on the ground to allow line to be advanced increases wear and tear on the device.

A different approach to automatic line feed is to provide a bearing device which is shifted by centrifugal force in response to change in the speed of rotation of the casing. The use of ball bearing members in the head offers advantages in terms of eliminating the need to bump the line trimmer head on the ground to advance line but tends to complicate assembly of the device both initially and when the line spool must be replaced. When the line spool is removed in the field, there is a risk that the ball bearing members may be dislodged from the unit and lost. Examples of this approach include U.S. Pat. No. 4,566,189 to Muto and U.S. Pat. No. 4,667,410 to Weid, et al.

Another approach to an automatic line feed is to provide spring loaded lugs or cams which move into and out of engagement with locking elements. One example is U.S. Pat. No. 4,104,796 to Sheldon which discloses radially shifted lugs which are spring loaded and shifted by centrifugal force out of engagement with locking lugs. The spring loaded lugs require special assembly and reduce the durability of the device. The patent to Sheldon also discloses the use of spring clips which engage and disengage notches on a perimeter of the spool carrier. The use of such spring clips is not preferred due to problems in manufacture, problems relating to the durability of spring elements and long term dependability.

The above problems encountered by the prior art are addressed by the invention which is summarized below.

DISCLOSURE OF INVENTION

The present invention relates to a line trimmer head adapted to be attached to a rotatable shaft of a motor drive. The line trimmer head includes an inverted cup-shaped housing rotated by the shaft. A spool containing a supply of line is disposed in the housing, and is normally rotatable with the housing in an interlocked position. The spool is selectively disengageable from the housing to rotate freely in a disengaged condition an incremental amount to feed an increment of line from the spool. A length of line extends from the spool and outwardly through the housing for cutting vegetation as the line trimmer is operated. Indexer means are provided between the spool and the housing for selectively disengaging the spool from the housing to allow for relative rotational movement between the spool and the housing. Spring means are also provided for biasing the means for disengaging the spool away from the interlocked position. A catch is provided for interlocking the spool and the housing in the interlocked position provided that the length of line extending from the housing exerts a sufficient centrifugal force on the spool to hold the indexer means in the interlocked position against the biasing force of the second means. The catch is released by a reduction of the centrifugal force applied to the spool by the line.

According to another aspect of the invention, the reduction of centrifugal force on the spool may be caused by either a reduction of the rotational speed of the shaft or may be caused by a reduction of the length of the line extending from the housing. In either case, the reduction in centrifugal force must be sufficient to enable the spring means to bias the indexer means away from the interlocked position.

According to another aspect of the present invention, a line trimmer head is provided which comprises a reel housing engaged by a rotatable shaft. An indexer cam is journaled on the shaft which is axially and rotatably shiftable with respect to the shaft. The indexer cam is rotated by said shaft, and periodically axially shifted by a reduction in centrifugal force applied thereto. In a preferred embodiment, the indexer cam includes a circumferential side wall. Cam means for axially shifting the indexer cam are provided between the side wall and an inner surface of the housing for axially shifting the indexer cam between an interlocked position and a disengaged condition. In the interlocked position, the indexer cam, housing, spool and shaft rotate together. In the disengaged condition, the indexer cam and spool rotate relative to the housing and shaft a predetermined incremental amount to allow feeding an increment of string from the spool.

Preferred aspects of the invention also include providing a cam track on the circumferential side wall of the indexer cam, and a follower on the inner surface of the housing. The cam track includes at least one ramp surface, and preferably six ramp surfaces, over which the follower moves to shift the indexer cam axially against the force exerted by a spring means and into engagement with housing. The cam track preferably includes at least one catch which stops rotational movement of the indexer cam, and releasably holds the follower until the centrifugal force applied by the line is reduced allowing the spring means to disengage the follower from the catch. The indexer cam is then disengaged from the housing.

According to another aspect of the invention, the first and second facing planar surfaces of the indexer cam and housing, respectively, lock the indexer cam and housing together when in the first position. The locking means on the indexer cam is preferably a web formed on the first planar surface. A plurality of stop blocks are formed on the second surface of the housing which are adapted to be received within the web on the indexer cam to absorb torque loads applied to the unit.

These and other aspects of the present invention will be better understood in view of the attached drawings and the following description of the best mode for carrying out the invention.

BRIEF DESCRIPTION OF THE DRAWINGS

FIG. 4 is a schematic view of the cam track showing the path of movement of the follower in the cam track.

FIG. 5 is a plan view with the housing partially broken away to show the stop block and follower elements of the housing.

FIG. 6 is an elevational view taken along the line 6—6 in FIG. 5.

BEST MODE FOR CARRYING OUT THE INVENTION

Figure 1:
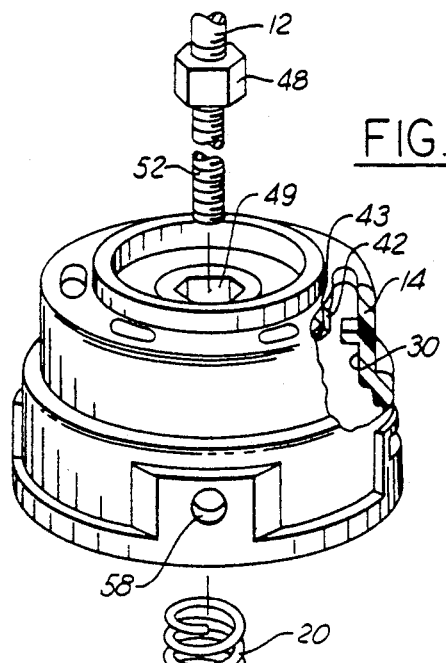
FIG. 1 is an exploded perspective view of the line trimmer head of the present invention, and a fragmentary view of a shaft which the head is adapted to be attached.

Referring now to FIG. 1, a line trimmer head 10 is shown connected to a shaft 12 which is rotated by the motor of a line trimmer device (not shown). The line trimmer head 10 includes a reel housing 14 which is an inverted cup-shaped member. An indexer cam 16 is disposed within the reel housing 14, and is connected to a spool 18 which contains a supply of line 19. A spring 20 is assembled to the shaft 12 between the indexer cam 16 and reel housing 14. The reel housing 14, indexer cam 16, spool 18 and spring 20 are all assembled on the shaft 12. A cup-shaped base cover 22 encloses the bottom of the reel housing 14.

The reel housing 14 and indexer cam 16 are formed of a rigid injection molded plastic of conventional type and being selected for durability.

The indexer cam 16 includes a key 24 formed on a cylindrical extension 25. A keyway 26 formed on the inner diameter of the spool 18 for receiving the key 24 when the cylindrical extension 25 is received in the spool 18. The indexer cam 16 includes a circumferential surface 28 which extends about its outer diameter. An inner cylindrical surface 30 of the reel housing 14 is located adjacent the circumferential surface 28 of the indexer cam 16 when the indexer cam 16 is assembled within the reel housing 14.

A cam track 32 is formed on the circumferential surface 28 of the indexer cam 16. The cam track 32 includes at least one and preferably four to eight ramp up surfaces 34 for axially shifting the indexer cam 16 toward the upper surface of the reel housing 14. A corresponding number of catches 36 are formed on the cam track 32. A corresponding number of followers 37 are formed on the inner surface 30 of the reel housing 14 which are adapted to move through the cam track 32. Each follower 37 is temporarily trapped by one of the catches 36 as will be more fully described below.

The indexer cam 16 includes an indexer web 38 which defines a series of arcuate voids 40 in a first planar surface 41 of the indexer cam 16. A stop block 42 is formed on a second planar surface 43 which forms the lower surface of the upper portion of the reel housing 14. Preferably, a plurality of stop blocks 42 are provided on the second planar surface 43 which are in alignment with a series of arcuate voids 40 on the first planar surface 41. As the indexer cam 16 rotates, the follower 37 drives the indexer cam 16 upwardly by following the ramp up surface 34 until the stop blocks 42 engage the arcuate voids 40 of the indexer web 38. The catch 36 preferably engages the follower 37 at the same time as the stop blocks 42 engage the indexer web 38. In this way, catch 36 is protected from impact forces because the stop blocks 42 engage the indexer web 38 to absorb impact forces.

A ramp down surface 44 may be provided on the catch 36 for shifting the stop blocks 42 out of engagement with the indexer web 38 when centrifugal forces applied to the spool 18 are reduced. The spring 20 biases the indexer cam 16 downwardly until the indexer web 38 is freed from the stop blocks 42. When this occurs, the follower 37 moves through another increment of the cam track 32, and allows corresponding increment of line 19 to be fed from the spool 18.

Base cover 22 retains the spool 18, and is assembled to the reel housing 14 by two assembly clips 45. The base cover 22 includes a spool support ring 46 having an end face 47 which engages the spool 18 in a rotatable sliding relationship. The spool 18 rides upon the end face 47 of the support ring 46. The line trimmer head 10 is held together by means of a top nut 48 which is received in a hex nut receptacle 49 formed in the top of the reel housing 14. A bottom nut 50 engages the base of the spool 18 to hold the spool 18, indexer cam 16, spring 20 and reel housing 14 together. The top nut 48 and bottom nut 50 are both received on a threaded end 52 of the shaft 12.

Indexer cam 16 is axially shiftable relative to the spool 18 because the key 24 is movable within the keyway 26. The indexer cam 16 and spool 18 rotate together due to the keyed relationship but may rotate independently of the reel housing 14 and base cover 22 when the indexer cam 16 is axially shifted to allow feeding of the line 19. Although not preferred, the spool 18 and indexer cam 16 could be formed in one piece. The spring 20 biases the indexer cam 16 away from the reel housing 14 so that the indexer web 38 is released from the stop blocks 42.

The indexer cam 16 preferably includes an annular recess 53 in which the spring 20 is received. The other end of the spring 20 bears upon the second planar surface 43 of the reel housing 14.

Figure 2:
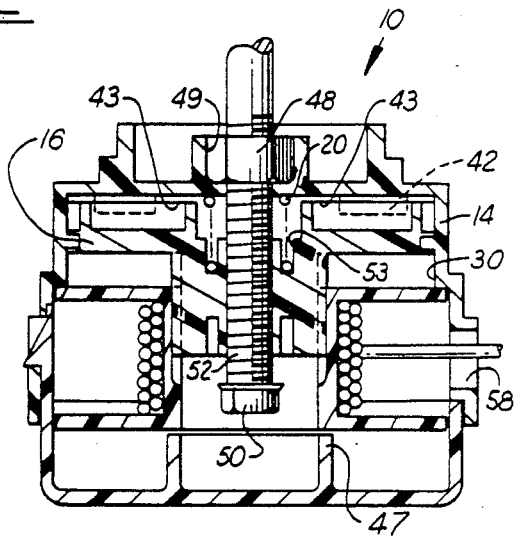
FIG. 2 is a cross-sectional view of the line trimmer head of the present invention in the interlock position.
Figure 3:
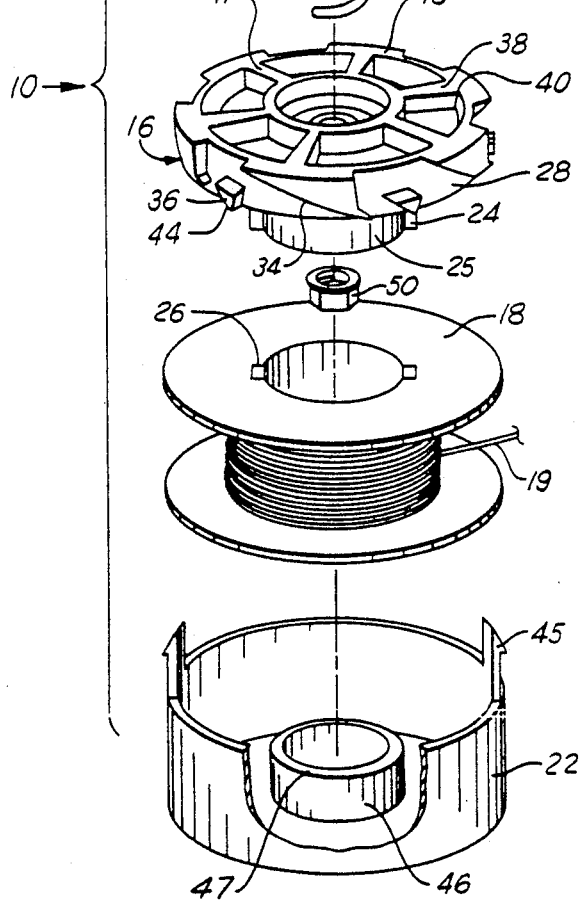
FIG. 3 is a cross-sectional view of the line trimmer head in the disengaged position.
Figure 3:
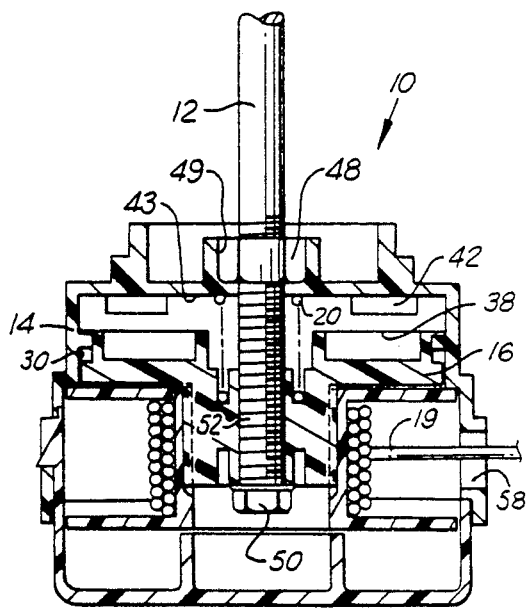

Referring now to FIGS. 2 and 3, the line trimmer head 10 is shown first in FIG. 2 in its fully interlocked condition wherein the indexer cam 16 interlocks the reel housing 14 and spool 18 together as one. The spring 20 is compressed with the indexer web 38 in engagement with the stop block 42. The follower 37 is adjacent to catch 36. The spring 20 biases the indexer cam 16 away from the interlocked position.

When enough line has worn away or the line breaks off, the centrifugal force applied by the line 19 to the spool 18 is reduced. Centrifugal force may also be reduced by slowing the speed of rotation of the shaft 12. A reduction in centrifugal force causes the follower 37 to become dislodged from the catch 36. The follower 37 then travels across the ramp down surface 44 of the catch 36 which causes the indexer web 38 to move away from the reel housing 14 until the stop blocks 42 are dislodged from the arcuate voids 40 of the indexer web 38.

The spring 20 axially shifts the indexer cam away from the reel housing 14 to a maximum axial shift position as shown in FIG. 3. In the maximum axial shift position, the spool 18 and indexer cam 16 freewheel relative to the reel housing 14 in a disengaged condition until the follower 37 moves to the next catch 36 in sequence. The stop blocks 42 are dislodged from the indexer web 38, and the follower 37 in the cam track 32 move towards the ramp up surface 34. As this occurs, the spool 18 dispenses an increment of line 19 through a string feed hole 58 in the housing 14.

The cam track 32 is shown diagrammatically in FIG. 4. The cam track 32 preferably includes a plurality of catches 36 and ramp up surfaces 34. Movement of the indexer cam 16 relative to the reel housing 14 will be described beginning with the follower 37 in engagement with the catch 36. At this position, the stop blocks are in engagement with the indexer web 38, and the entire reel housing including the indexer cam 16 and the spool 18 move together as a unit.

When shaft rotational speed is reduced or the line breaks or is abraded to a sufficient extent to cause a predetermined reduction in the centrifugal force applied by the line 19 to the spool 18, the follower moves up the ramp down surface 44 until it is free of the catch 36. The follower 37 then moves relative to the indexer cam 16. When the indexer cam 16 rotates relative to the reel housing 14 so that an increment of line 19 is dispensed from the spool 18. Line feed continues as the follower 37 engages the ramp up surface 34. When the follower 37 contacts the ramp up surface 34, the indexer cam 16 is driven toward the upper surface of the reel housing 14. This axial shifting movement causes the stop blocks 42 to engage the indexer web 38. When this occurs, the catch 36 contacts the next follower 37.

Assuming that sufficient centrifugal force is being applied by the additional length of line, the catch 36 will hold the follower 37. If additional line is required, centrifugal force applied by the line 19 to the spool 18 will be insufficient to allow the catch 36 to hold the follower 37.

Referring now to FIG. 5, a partially broken away section shows the alignment of the followers 37 relative to the stop blocks 42. Preferably, more than one follower 37 is provided on the inner surface 30 of the reel housing 14. In this way, forces applied to the followers 37 and catches 36 are balanced about the circumference of the indexer cam 16 thereby providing a simple and durable construction. The stop blocks 42 are generally centrally spaced relative to the followers 37 so that they engage the indexer web 38 at the same time as the catches 36 engage the followers 37.

Referring now to FIG. 6, each follower 37 preferably includes a bearing surface 60 which is adapted to ride along the ramp up surface 34 and the ramp down surface 44. FIG. 6 also shows the alignment of the stop blocks 42 relative to the followers 37 on the inner surface 30 of the housing 14.

The preceding description of the illustrated embodiment of the invention is intended to describe the best mode of practicing the invention. It will be readily appreciated by one of ordinary skill in the art that certain modifications and improvements may be made to the disclosed embodiment without departing from the spirit and scope of the present invention. The present invention should be measured by the following claims.

I claim:

1. A line trimmer head for attachment to a rotatable shaft driven by a motor, said line trimmer head comprising:

a generally cup-shaped housing having depending side walls defining an enclosure having a line outlet opening, said housing being rotated by said shaft;

a spool containing a supply of line disposed in said housing, said spool being normally rotatable with said housing in an interlocked position and selectively disengageable from said housing to freewheel an incremental amount in a disengaged position to allow an increment of line to be fed from said spool through said opening in said housing with a segment of said line extending outwardly from said housing;

indexer means disposed between said spool and said housing for disengaging said spool from said housing allowing relative rotational movement therebetween, said indexer means comprising an indexer cam journaled on said shaft, said indexer cam being axially and rotatably shiftable with respect to said shaft and being periodically axially shifted by said reduction in centrifugal force, said indexer cam including a circumferential side wall having means disposed between said side wall and an inner cylindrical surface of said housing for axially shifting said indexer cam between said interlocked position and a disengaged condition, said means for axially shifting comprising a cam track on said side wall and a follower on said inner surface of said housing;

spring means for biasing said indexer means away from said interlocked position; and catch means for interlocking said spool and said housing in said interlocked position, said catch means being operatively engaged by said spring means provided that said length of line extending from said housing exerts a sufficient centrifugal force on the spool to maintain an interlock against the biasing force of said spring means, said interlock of said catch means being released by a reduction of the centrifugal force applied to said spool.

2. The line trimmer head of claim 1 wherein said spring means biases said indexer means away from said interlocked position wherein a reduction of the rotation speed of said shaft causes said reduction of centrifugal force.

3. The line trimmer head of claim 1 wherein said spring means biases said indexer means away from the interlocked position when a reduction of the length of the line extending from said housing causes a reduction of centrifugal force.

4. The line trimmer head of claim 1 wherein said cam track includes at least one ramp surface over which said follower moves to shift said indexer cam axially against the force exerted by said spring means and into engagement with said housing when said catch means stops rotational movement of said indexer cam, said catch means releasably holding said follower until the centrifugal force is reduced wherein said spring means releases said follower from said catch and disengages said indexer cam from said housing.

5. A line trimmer head comprising:
  a reel housing having an upper surface and a depending side wall defining a partially enclosed space, said housing having a line feed opening in said side wall;
  a rotatable shaft engaging said reel housing to rotate said reel housing;
  an indexer cam having a circumferential side wall, said indexer cam being journaled on said shaft and being axially and rotatably shiftable with respect to said shaft;
  spring means for biasing said indexer cam axially relative to said housing, said spring means being disposed between said indexer cam and said housing;
  a spool disposed in said housing and engaging said indexer cam for rotation therewith;
  a supply of line retained on said spool and being periodically unwound in incremental lengths from said spool through said line feed opening in said housing;
  said indexer cam being rotated by said shaft and periodically axially shifted by a reduction in the centrifugal force applied by said line to said spool;
  cam means disposed between said circumferential side wall of said indexer cam and an inner surface of said housing for axially shifting said indexer cam between an interlocked position and a disengaged condition, said cam means for axially shifting further comprising a cam track on said circumferential side wall and a follower on said housing, said indexer cam and said housing being interlocked together and wherein said spool, indexer cam, housing and shaft rotate together in said interlocked position, said indexer cam being selectively rotatable relative to said housing and wherein said spool and indexer cam rotate relative to said housing and said shaft a predetermined incremental amount in its disengaged condition thereby allowing said incremental length of line to be fed from said spool.

6. The line trimmer head of claim 5 wherein said cam track includes at least one ramp surface over which said follower moves to shift said indexer cam axially against the force exerted by said spring means and into engagement with said housing, said cam track further including at least one catch which stops rotational movement of said indexer cam and releasably holds said follower until the centrifugal force decreases wherein said spring means disengages said follower from said catch and said indexer cam is allowed to rotate relative to said housing.

7. A line trimmer head for attachment to a rotatable shaft driven by a motor, said line trimmer head comprising:

a generally cup-shaped housing having depending side walls defining an enclosure having a line outlet opening, said housing being rotated by said shaft;
  a spool containing a supply of line disposed in said housing, said spool being normally rotatable with said housing in an interlocked position and selectively disengageable from said housing to freewheel an incremental amount in a disengaged position to allow an increment of line to be fed from said spool through said opening in said housing with a segment of said line extending outwardly from said housing;
  indexer means disposed between said spool and said housing for disengaging said spool from said housing allowing relative rotational movement therebetween;
  catch means for locking said indexer cam and said housing together in said interlocked position, said catch means being provided on first and second facing planar surfaces of said indexer means and said housing respectively;
  spring means for biasing said indexer means away from said interlocked position said spring means being disposed on said shaft between said housing and said indexer means; and
  said catch means being operatively engaged by said spring means provided that said length of line extending from said housing exerts a sufficient centrifugal force on the spool to maintain an interlock against the biasing force of said spring means, said interlock of said catch means being released by a reduction of the centrifugal force applied to the spool.

8. The line trimmer head of claim 7 wherein said catch means comprises a web formed on said first planar surface of said indexer means and a plurality of stop blocks are formed on said second planar surface of said housing, said stop blocks being received within said web to reduce the impact of any torque loads on said catch means.

9. A line trimmer head for attachment to a rotatable shaft driven by a motor, said line trimmer head comprising:
  a generally cup-shaped housing having depending side walls defining an enclosure having a line outlet opening, said housing being rotated by said shaft;
  a spool containing a supply of line disposed in said housing with a segment of said line extending outwardly from said housing, said spool being normally rotatable with said housing in an interlocked position and selectively disengageable from said housing to freewheel an incremental amount in a disengaged position to allow an increment of line to be fed from said spool through said opening in said housing;
  indexer means for disengaging said spool from said housing and thereby allowing relative rotational movement therebetween, said indexer means being disposed between said spool and said housing and being interlocked rotationally with said spool and axially shiftable to allow for axial shifting of the indexer means relative to said spool, a detent ridge being provided on the inner surface of said housing to prevent axial shifting of said spool with the indexer means;
  spring means for biasing said indexer means away from said interlocked position; and catch means for interlocking said spool and said housing in said interlocked position, said catch means being operatively engaged by said spring means provided that said length of line extending from said housing exerts a sufficient centrifugal force on the spool to maintain an interlock against the biasing force of said spring means, said interlock of said catch means being released by a reduction of the centrifugal force applied to said spool.

10. A line trimmer head comprising:
a reel housing having an upper surface and a depending side wall defining a partially enclosed space, said housing having a line feed opening in said side wall;
a rotatable shaft engaging said reel housing to rotate said reel housing;
an indexer cam having a circumferential side wall, said indexer cam being journaled on said shaft and being axially and rotatably shiftable with respect to said shaft;
spring means for biasing said indexer cam axially relative to said housing, said spring means being disposed between said indexer cam and said housing;
a spool disposed in said housing and engaging said indexer cam for rotation therewith;
said indexer cam and said spool being interlocked rotationally and axially shiftable to allow for axial shifting of the indexer cam;
a detect ridge provided on the inner surface of said housing to prevent axial shifting of said spool with the indexer cam;
a supply of line retained on said spool and being periodically unwound in incremental lengths from said spool through said line feed opening in said housing;
said indexer cam being rotated by said shaft and periodically axially shifted by a reduction in the centrifugal force applied by said line to said spool; and
cam means disposed between said circumferential side wall of said indexer cam and an inner surface of said housing for axially shifting said indexer cam between an interlocked position and a disengaged condition, said indexer cam and said housing being interlocked together and wherein said spool, indexer cam, housing and shaft rotate together in said interlocked position, said indexer cam being rotatable relative to said housing and wherein said spool and indexer cam rotate relative to said housing and said shaft a predetermined incremental amount in its disengaged condition thereby allowing said incremental length of line to be fed from said spool.

11. A line trimmer head comprising:
a reel housing having an upper surface and a depending side wall defining a partially enclosed space, said housing having a line feed opening in said side wall;
a rotatable shaft engaging said reel housing to rotate said reel housing;
an indexer cam having a circumferential side wall, said indexer cam being journaled on said shaft and being axially and rotatably shiftable with respect to said shaft;
spring means for biasing said indexer cam axially relative to said housing, said spring means being disposed between said indexer cam and said housing;
a spool disposed in said housing and engaging said indexer cam for rotation therewith;
a supply of line retained on said spool and being periodically unwound in incremental lengths from said spool through said line feed opening in said housing;
said indexer cam being rotated by said shaft and periodically axially shifted by a reduction in the centrifugal force applied by said line to said spool; and
cam means disposed between said circumferential side wall of said indexer cam and an inner surface of said housing for axially shifting said indexer cam between an interlocked position and a disengaged condition, said indexer cam and said housing being interlocked together, said cam means further comprising lock means for locking said indexer cam and said housing together in said interlocked position said lock means being provided on first and second facing planar surfaces of said indexer cam and said housing respectively, and wherein said spool, indexer cam housing said shaft rotate together in said interlocked position, said indexer cam being rotatable relative to said housing and wherein said spool and indexer cam rotate relative to said housing and said shaft a predetermined incremental amount in its disengaged condition thereby allowing said incremental length of line to be fed from said spool.

12. The line trimmer head of claim 11 wherein said lock means comprises a web formed on said first planar surface of said indexer cam and a plurality of stop blocks are formed on said second planar surface of said housing, said stop blocks being received within said web to reduce the effect of any torque loads on said cam means.

* * * * *